US012587749B2

(12) United States Patent
Idaka

(10) Patent No.: US 12,587,749 B2
(45) Date of Patent: Mar. 24, 2026

(54) CONTROL APPARATUS AND CONTROL METHOD THEREFOR

(71) Applicant: CANON KABUSHIKI KAISHA, Tokyo (JP)

(72) Inventor: Sayuri Idaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 33 days.

(21) Appl. No.: 18/812,058

(22) Filed: Aug. 22, 2024

(65) Prior Publication Data

US 2025/0080854 A1 Mar. 6, 2025

(30) Foreign Application Priority Data

Sep. 1, 2023 (JP) ................................. 2023-142379

(51) Int. Cl.
*H04N 23/695* (2023.01)
*H04N 23/667* (2023.01)

(52) U.S. Cl.
CPC ......... *H04N 23/695* (2023.01); *H04N 23/667* (2023.01)

(58) Field of Classification Search
CPC .... H04N 23/695; H04N 23/667; H04N 23/69; H04N 23/66; G08B 13/1963
See application file for complete search history.

(56) References Cited

U.S. PATENT DOCUMENTS

| | | | | |
|---|---|---|---|---|
| 2003/0193611 A1* | 10/2003 | Yoshimura | ................ | H02P 8/12 |
| | | | | 348/374 |
| 2008/0111891 A1* | 5/2008 | Kurita | .................... | H04N 23/66 |
| | | | | 348/E5.043 |
| 2008/0260369 A1* | 10/2008 | Ibaraki | ............... | H04N 23/6815 |
| | | | | 348/E5.042 |
| 2017/0357152 A1* | 12/2017 | Ashitani | ................ | G03B 31/00 |
| 2022/0116541 A1* | 4/2022 | Ashitani | .............. | H04N 23/695 |
| 2022/0239838 A1* | 7/2022 | Idaka | .................... | H04N 23/58 |

FOREIGN PATENT DOCUMENTS

| JP | H0918747 A | | 1/1997 |
|---|---|---|---|
| JP | 2022101206 A | * | 7/2022 |
| JP | 2023117763 A | | 8/2023 |

OTHER PUBLICATIONS

The above U.S. Patent Application Publication and Foreign Patent Documents were cited in a European Office Action that issued on Jan. 24, 2025, which is enclosed, that issued in the corresponding European Patent Application No. 24197176.1.

* cited by examiner

*Primary Examiner* — Abdelaaziz Tissire
(74) *Attorney, Agent, or Firm* — Cowan, Liebowitz & Latman, P.C.

(57) ABSTRACT

A control apparatus comprises a driving unit configured to change an orientation of an image capturing unit. In a case where the orientation of the image capturing unit is changed, the control apparatus applies a first current value applied at the time of normal driving to the driving unit in a case where a speed of the driving unit does not fall within a predetermined speed range, and applies a second current value larger than the first current value to the driving unit in a case where the speed of the driving unit falls within the predetermined speed range.

7 Claims, 7 Drawing Sheets

F I G. 2A
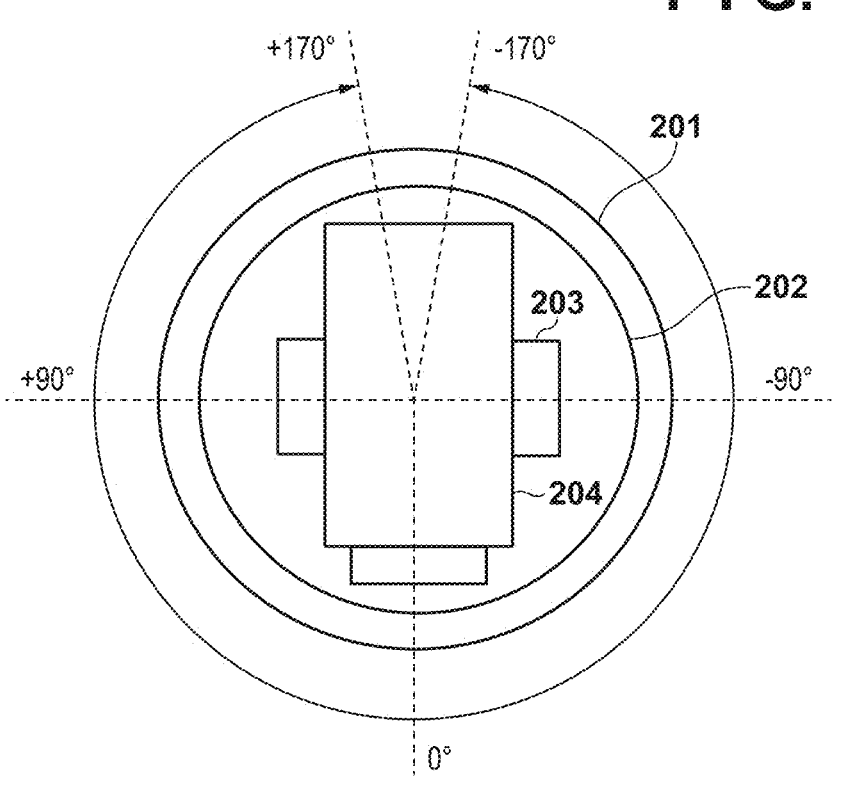
F I G. 2B
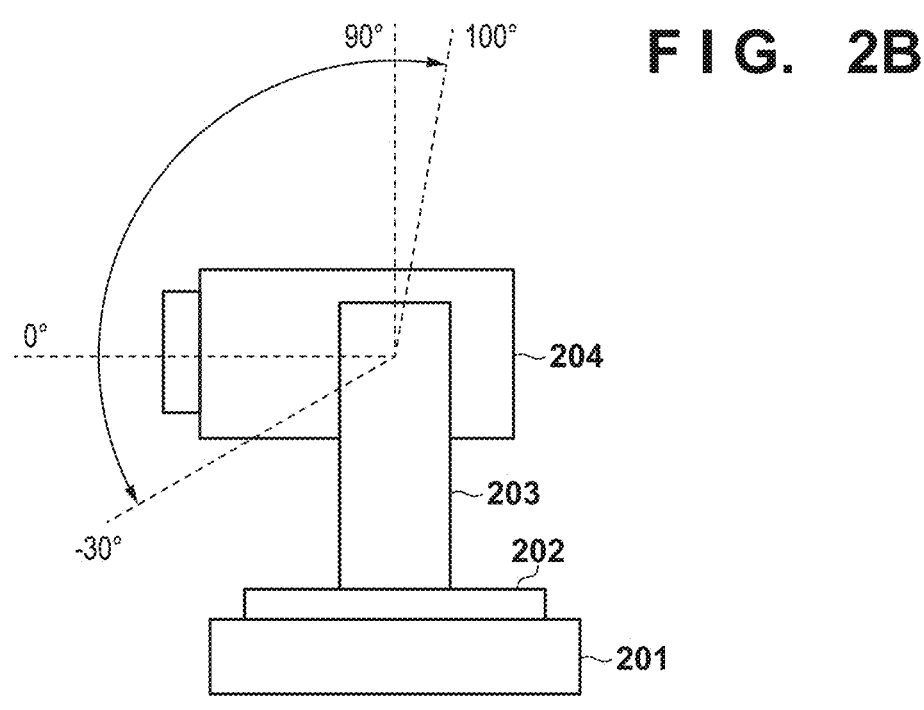

F I G.   3A
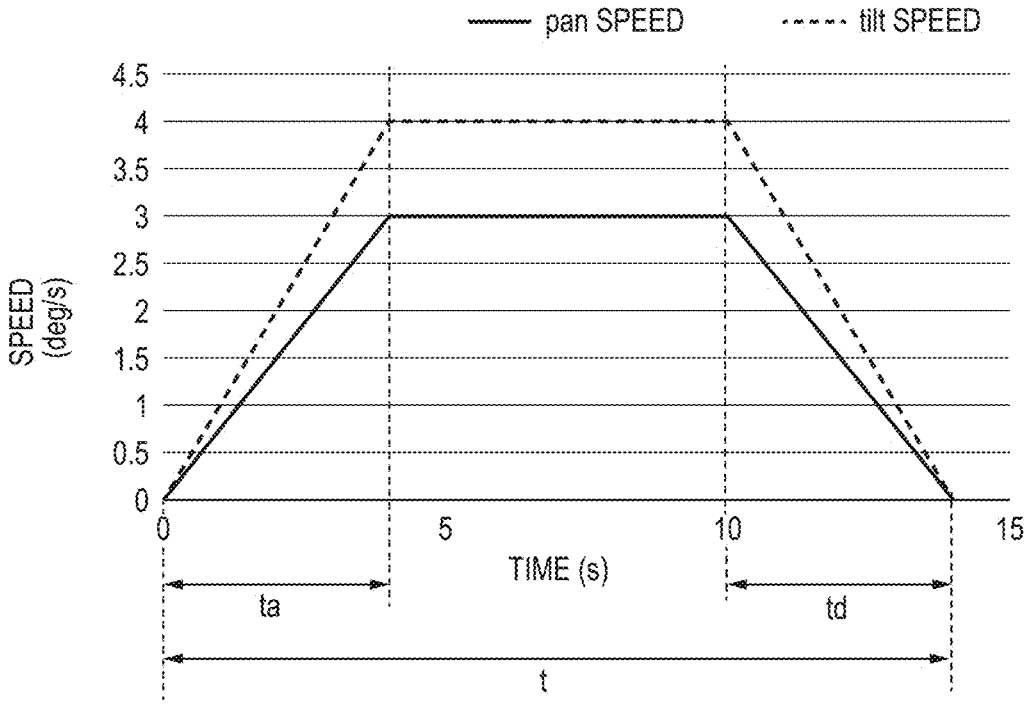
F I G.   3B
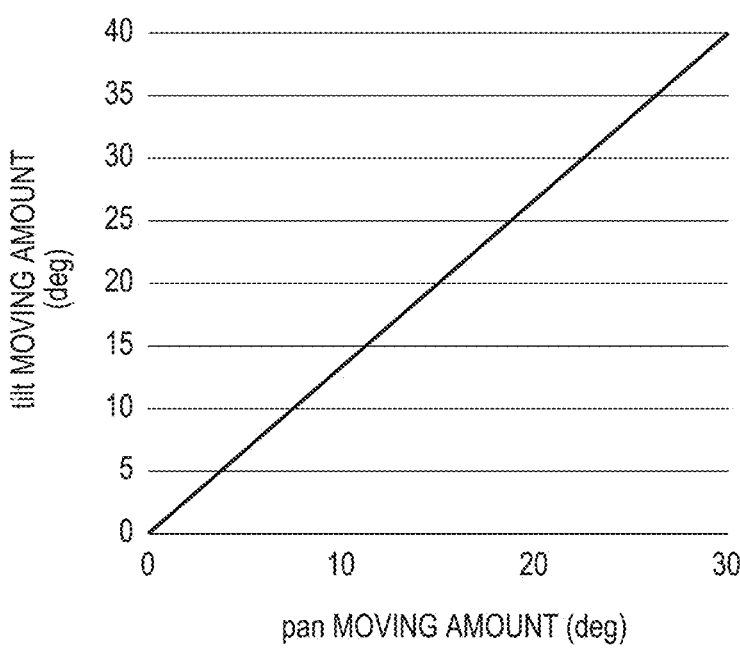

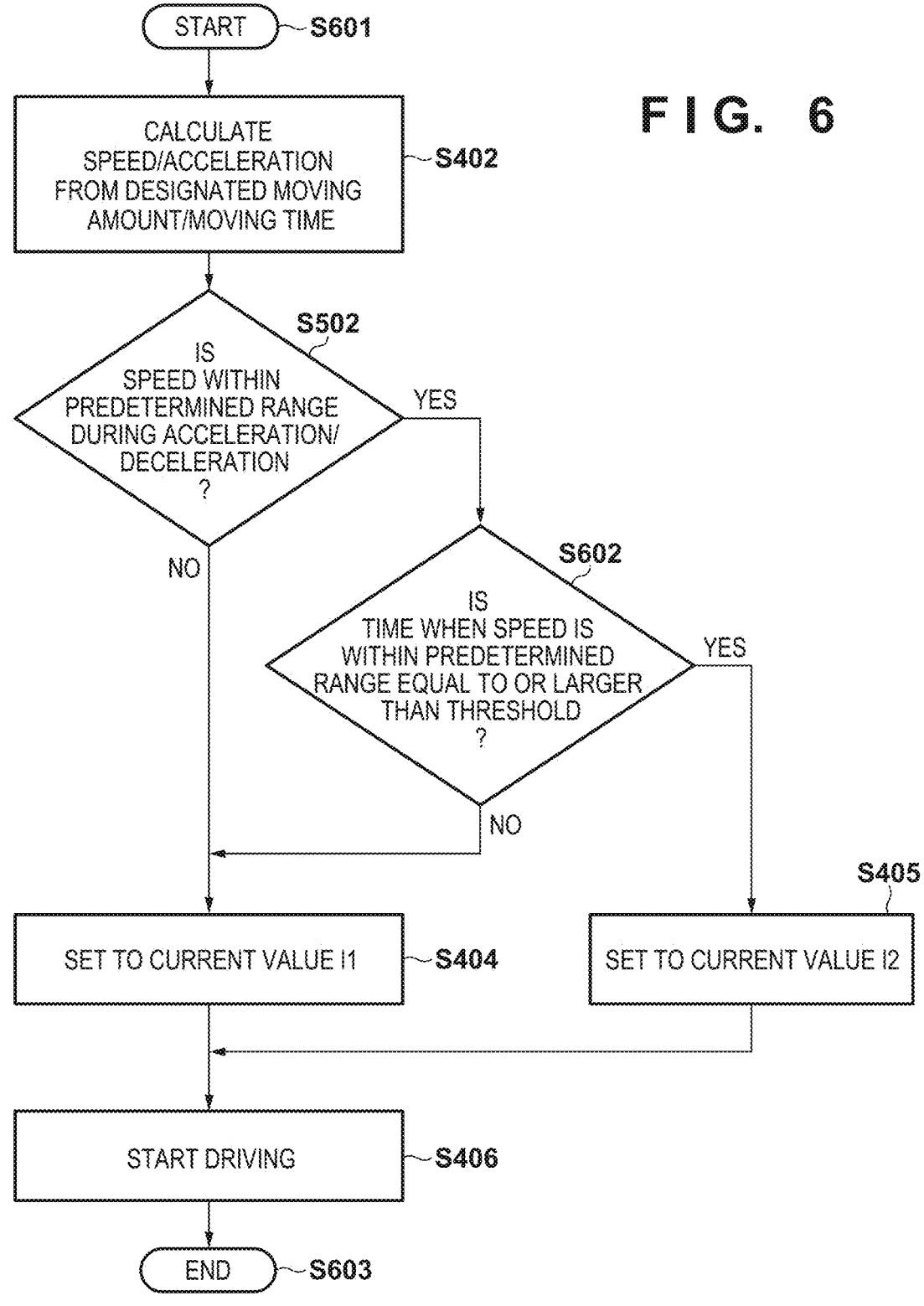
F I G.  6

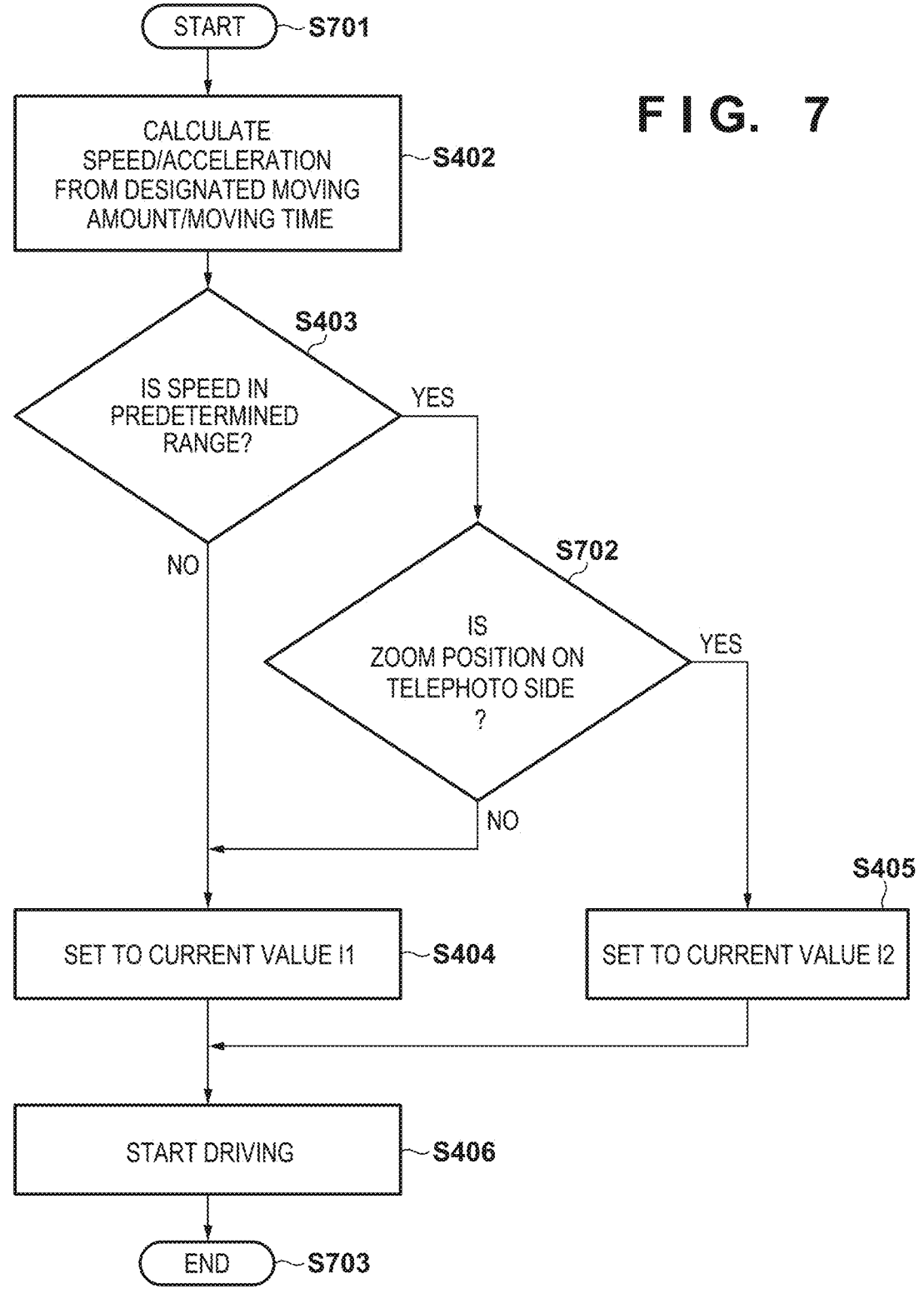
F I G.  7

CONTROL APPARATUS AND CONTROL METHOD THEREFOR

BACKGROUND OF THE INVENTION

Field of the Invention

The present invention relates to a technique of controlling the orientation of a camera.

Description of the Related Art

In a monitoring system or a video distribution system, a pan/tilt (PT) camera that can be controlled via a network, a dedicated line, a remote controller, or the like to view a video is used. The PT camera includes a mechanism that can rotate in the pan direction (horizontal direction) and the tilt direction (vertical direction), and can change the shooting direction.

Depending on the mechanical characteristic of a PT driving unit, a vibration or a sound may be generated by resonance when driving at a speed within a predetermined speed range, and uneven speed may occur when the speed periodically, slightly changes. In video distribution, focus is placed on video quality, and quietness and smooth PT driving have been required. Japanese Patent Laid-Open No. 9-18747 (patent literature 1) discloses a method of switching a current value in accordance with an operation mode to drive a motor from a low speed to a high speed while suppressing a vibration.

However, in the technique described in patent literature 1, since the current value is increased in a high-speed mode, a resonance sound becomes large.

SUMMARY OF THE INVENTION

According to one aspect of the present invention, a control apparatus for controlling an image capturing unit capable of changing an orientation, comprises: a driving unit configured to change the orientation of the image capturing unit; one or more memories storing instructions; and one or more processors executing the instructions to: perform driving control of the driving unit in a case where the orientation of the image capturing unit is changed, wherein in a case where the orientation of the image capturing unit is changed and in a case where a speed of the driving unit does not fall within a predetermined speed range, a first current value applied at the time of normal driving is applied to the driving unit, and in a case where the orientation of the image capturing unit is changed and in a case where the speed of the driving unit falls within the predetermined speed range, a second current value larger than the first current value is applied to the driving unit.

According to the present invention, it is possible to perform more appropriate PT driving control.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are views for explaining the mechanical structure and the movable range of the PTZ camera;

FIGS. 3A and 3B are a timing chart and a graph showing acceleration/deceleration control at the time of a shot operation;

FIG. 6 is a flowchart of PT control (third embodiment); and

FIG. 7 is a flowchart of PT control (fourth embodiment).

DESCRIPTION OF THE EMBODIMENTS

Figure 1:
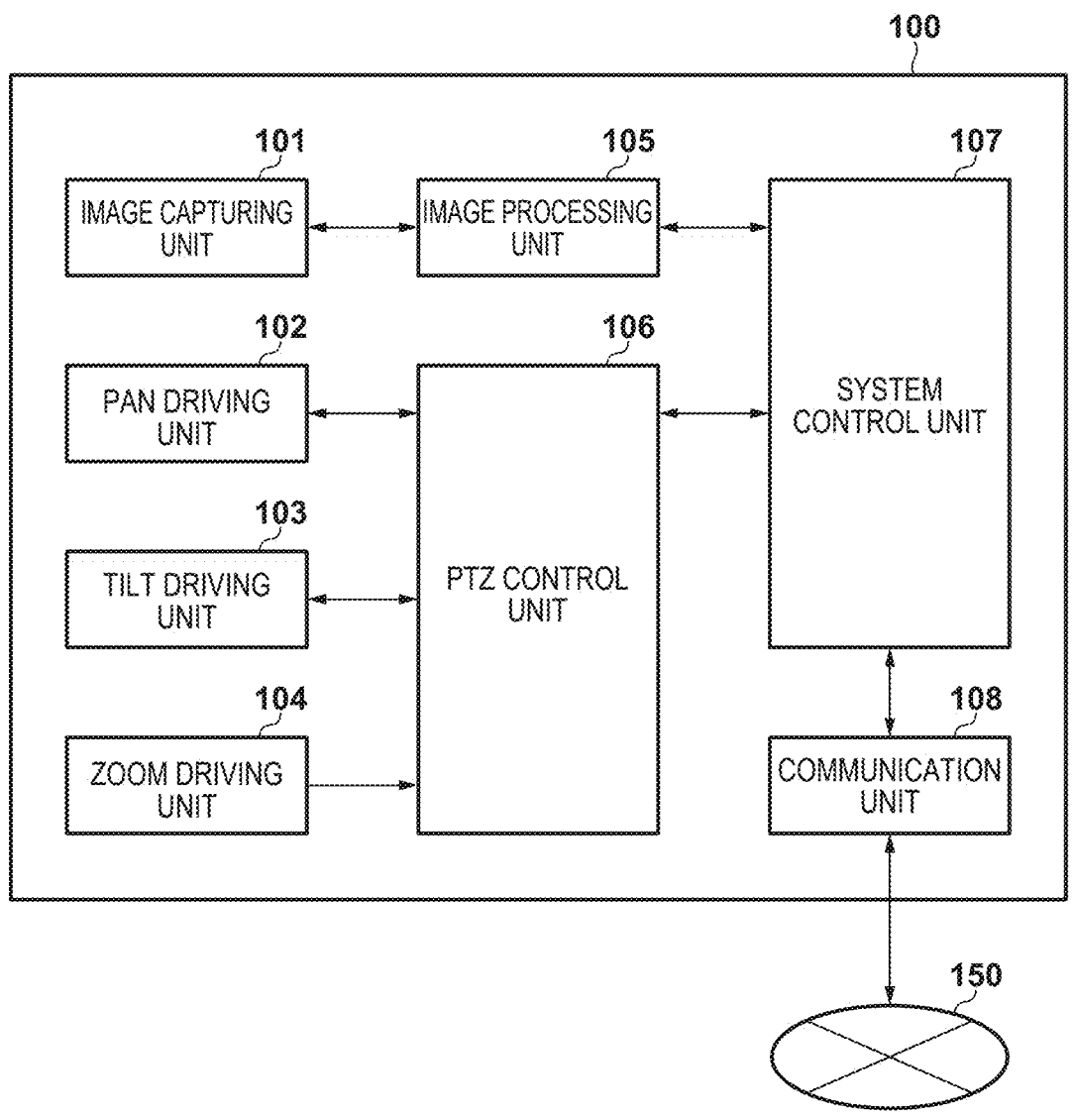
FIG. 1 is a block diagram showing the functional blocks of a PTZ camera.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As the first embodiment of a control apparatus according to the present invention, change control of a current value to be applied to a driving unit of a pan/tilt/zoom (PTZ) camera will be described as an example.

<Arrangement of Apparatus>

FIG. 1 is a block diagram showing the functional blocks of a PTZ camera 100. The PTZ camera 100 is connected to a client apparatus (information processing apparatus) (not shown) via a network 150 so that they can communicate with each other. A user can transmit various camera control commands to the PTZ camera 100 via the client apparatus.

The PTZ camera 100 includes an image capturing unit 101, a pan driving unit 102, a tilt driving unit 103, a zoom driving unit 104, an image processing unit 105, a PTZ control unit 106, a system control unit 107, and a communication unit 108.

The image capturing unit 101 is formed from lenses for image capturing including a focus lens and a zoom lens, an image sensor, and a mechanical driving system and circuits for driving the above-described components. An object image is formed on the image sensor by the lenses for image capturing, and the image sensor generates an electrical signal representing the object image.

The pan driving unit 102 is formed from a mechanical driving system for performing a pan operation, a motor serving as a driving source, a motor driver, and the like, and controlled by the PTZ control unit 106. The PTZ control unit 106 sets a driving amount, a speed, acceleration, a driving current, and the like in the pan driving unit 102, and starts driving by a driving start command. A detailed arrangement will be described later with reference to FIGS. 2A and 2B.

The tilt driving unit 103 is formed from a mechanical driving system for performing a tilt operation, a motor serving as a driving source, a motor driver, and the like, and controlled by the PTZ control unit 106. The PTZ control unit 106 sets a driving amount, a speed, acceleration, a driving current, and the like in the tilt driving unit 103, and starts driving by a driving start command. A detailed arrangement will be described later with reference to FIGS. 2A and 2B.

The zoom driving unit 104 is a driving unit that changes the image capturing angle of view of the image capturing unit 101. The zoom driving unit 104 is formed from a mechanical driving system for performing a zoom operation, a motor serving as a driving source, a motor driver, and the like, and controlled by the PTZ control unit 106.

The image processing unit 105 performs predetermined development processing, compression coding processing, and the like for the electrical signal generated by the image capturing unit 101 to generate image data, and transfers the image data to the system control unit 107. If an image quality adjustment instruction is received from the system control unit 107, the image processing unit 105 adjusts the image quality.

The PTZ control unit 106 processes an instruction concerning PTZ control received from the system control unit 107. For example, based on a pan/tilt instruction received from the system control unit 107, the PTZ control unit 106 performs control of the driving amount, speed, and acceleration/deceleration of each of the pan driving unit 102 and the tilt driving unit 103, an initialization operation, and the like. Furthermore, based on a zoom instruction received from the system control unit 107, the PTZ control unit 106 performs control of the driving amount, speed, and acceleration/deceleration of the zoom driving unit 104, an initialization operation, and the like. The PTZ control unit 106 may adopt a software implementation form implemented when a CPU executes a program or a hardware implementation form such as an Application Specific Integrated Circuit (ASIC). Alternatively, the PTZ control unit 106 may be implemented by combining the software implementation and the hardware implementation.

The system control unit 107 controls the overall PTZ camera 100. In addition, the system control unit 107 distributes image data generated by the image processing unit 105 to the client apparatus (not shown) via the communication unit 108. Furthermore, the system control unit 107 analyzes the camera control command transferred from the client apparatus (not shown) via the communication unit 108 and performs processing corresponding to the command. For example, the system control unit 107 sends an image quality adjustment instruction to the image processing unit 105, and sends a PTZ operation instruction and a shot operation instruction to the PTZ control unit 106. The system control unit 107 may adopt a software implementation form implemented when the CPU executes a program or a hardware implementation form such as an Application Specific Integrated Circuit (ASIC). Alternatively, the system control unit 107 may be implemented by combining the software implementation and the hardware implementation.

The communication unit 108 receives the camera control command transmitted from the client apparatus, and transfers it to the system control unit 107. Furthermore, the communication unit 108 transmits, to the client apparatus (not shown), the image data generated by the image processing unit 105 and a response to the camera control command.

Note that the PTZ camera 100 in this embodiment is not limited to the arrangement shown in FIG. 1. For example, the PTZ camera 100 may be provided with a video output terminal such as a Serial Digital Interface (SDI) or a High-Definition Multimedia Interface (HDMI)®, an audio input/output unit, or an external device input/output unit. The communication unit 108 may be connected by wired connection or wireless connection. The communication unit 108 may be connected not to the network 150 but to another device by serial communication or the like.

FIGS. 2A and 2B are views for explaining the mechanical structure and the movable range of the PTZ camera 100.

FIG. 2A is a view of the attached PTZ camera 100 when viewed from the top (a tilt angle of "+90°") direction. FIG. 2B is a view of the PTZ camera 100 installed upright when viewed from the side. In FIGS. 2A and 2B, the PTZ camera 100 is formed from a bottom case 201, a turn table 202, a camera head support 203, and a camera head 204.

In the following description, an operation of a PT movable unit will be described while defining the axis of the PTZ camera 100 in the vertical direction as a vertical axis and the axis orthogonal to the vertical axis as a horizontal axis. Note that in FIG. 2A, with the vertical axis orthogonal to the paper surface as the center, the clockwise direction is the positive (plus) direction of the pan angle, and the counterclockwise direction is the negative (minus) direction of the pan angle. Further, in FIG. 2B, with the axis orthogonal to the paper surface as the center, the clockwise direction is the positive direction of the tilt angle, and the counterclockwise direction is the negative direction of the tilt angle.

The pan driving unit 102 is formed from the bottom case 201 and the turn table 202, and the turn table 202 rotates in the horizontal direction with the vertical axis as the center. The pan driving unit 102 in this embodiment can rotate from "−170°" to "+170°" in the pan direction with a given reference direction (0°) as the center.

The tilt driving unit 103 is formed from the camera head 204 and the camera head support 203 provided on the turn table 202, and the camera head 204 rotates in the vertical direction with the horizontal axis as the center. If the tilt driving unit 103 of this embodiment is installed upright, as shown in FIG. 2B, it can rotate from "−30°" in the diagonally downward direction to "+100°" in the diagonally upward direction with the horizontal direction (0°) as the reference.

Each of the angles shown in FIGS. 2A and 2B indicates the angle which the user can instruct to the PTZ camera 100. The PTZ control unit 106 gives a driving instruction to the pan driving unit 102 or the tilt driving unit 103 while using the angles shown in FIGS. 2A and 2B as the references. As described above, the PTZ camera 100 of this embodiment can change the shooting direction by rotating the orientation of the camera head 204 in the pan direction and the tilt direction, so that it can shoot a wide range. Note that the PTZ camera 100 is not limited to the arrangement shown in FIGS. 2A and 2B. For example, the PTZ camera 100 may be capable of 360° (endless) driving in the pan direction and/or the tilt direction.

<Shot Operation>

A shot operation indicates a control operation of performing PT driving so that pan driving and tilt driving are started substantially simultaneously and stopped substantially simultaneously when changing the orientation (shooting direction) of the camera. Note that the same control may also be performed for zoom driving.

FIGS. 3A and 3B are a timing chart and a graph showing acceleration/deceleration control at the time of the shot operation. FIG. 3A is a timing chart showing a change in speed of each of the pan driving unit 102 and the tilt driving unit 103 at the time of the shot operation. FIG. 3B is a graph showing the relationship between a pan moving amount and a tilt moving amount.

In FIG. 3A, the abscissa represents the time, the ordinate represents the speed, a solid line represents the pan speed, and a broken line represents the tilt speed. More specifically, the pan driving unit 102 and the tilt driving unit 103 start driving substantially simultaneously at "0 sec", perform acceleration driving control for 4 sec, constant-speed driving control, and deceleration driving control for 4 sec, and then stop driving substantially simultaneously at "14 sec". During the constant-speed driving period, the pan driving unit 102 performs constant-speed driving at "3 times/see" and the tilt driving unit 103 performs constant-speed driving at "4 times/see". The moving amount of the pan driving unit 102 is "30°'" and the moving amount of the tilt driving unit 103 is "40°'".

In FIG. 3B, the abscissa represents the pan moving amount and the ordinate represents the tilt moving amount. FIG. 3B shows the relationship between the pan moving amount and the tilt moving amount when performing driving at the speeds shown in FIG. 3A. In FIG. 3B, the ratio between the pan moving amount and the tilt moving amount is constant (the graph is a straight line), and the relationship between the pan moving amount and the tilt moving amount is linear (linear driving). In linear driving, the shooting direction of the camera linearly moves. On the other hand, for example, if the acceleration/deceleration time is different between the pan driving unit 102 and the tilt driving unit 103, the graph is not a straight line and no linear driving is performed.

To perform the shot operation, the PTZ control unit 106 needs to register in advance the target positions of the pan driving unit 102, the tilt driving unit 103, and the zoom driving unit 104. For example, the target positions are registered as "shot 1". Assume that in "shot 1", the pan position is "30°'", the tilt position is "40°'", and the zoom position is "telephoto end position". Assume here that the shot operation is executed by designating the moving speed or the moving time.

Consider a case where when the current positions are the pan position "0°'", the tilt position "0°'", and the zoom position "telephoto end position", movement to the positions of "shot 1" is performed by designating a moving time of "14 sec". In this case, the PTZ control unit 106 calculates a pan moving amount as "30°'", a tilt moving amount as "40°'", and a zoom moving amount as "0 (no movement)".

To stop driving 14 sec after the start of pan driving and tilt driving, the PTZ control unit 106 calculates the speed and acceleration of each driving unit and sets them. As shown in FIG. 3A, t represents the moving time, ta represents the acceleration time, td represents the deceleration time, and v represents the speed of constant-speed driving. In this case, by a method of obtaining the area of a trapezoid, a moving amount x can be given by:

$$x = (t + t - ta - td) * v * \frac{1}{2} \tag{1}$$

Therefore, the speed v can be calculated by equation (2) obtained by deforming equation (1).

$$v = \frac{2 * x}{2 * t - ta - td} \tag{2}$$

Assume that the acceleration time (ta) is "4 sec", and the deceleration time (td) is "4 sec". In this case, the speed of the constant-speed driving of panning is calculated as "3 times/see" in order to perform driving by the pan moving amount "30°'" in 14 sec. Similarly, the speed of the constant-speed driving of tilting is calculated as "4 times/see" in order to perform driving by the tilt moving amount "40°'" in 14 sec.

Furthermore, if moving to the positions of "shot 1" is performed by designating the moving speed instead of the moving time, v in equation (1) is known. Therefore, the moving time t can be calculated by:

$$t = \frac{x}{v} + \frac{ta + td}{2} \tag{3}$$

The moving time of each driving unit is calculated by equation (3), and a longest one of the calculated moving times is set as the moving time at the time of the shot operation. Then, the speed is calculated by equation (2) so that other driving units can move within the set moving time.

Consider a case where when the current positions are the pan position "0°'", the tilt position "0°'", and the zoom position "telephoto end position", movement to the positions of "shot 1" is performed by designating a moving speed of "4 times/see". In this case, if the moving time of each driving unit is obtained by equation (3), the moving time of the tilt driving unit is "14 sec" which is longest. Therefore, the moving time at the time of the shot operation is set to "14 sec". In addition, the speed of the tilt driving unit is "4 times/see" which has been designated. The speed of the pan driving unit is calculated using equation (2) by setting the moving time "14 sec", thereby obtaining "3 times/see". Since the speed and the acceleration time are already known, the acceleration can be obtained by "speed÷acceleration time".

The PTZ control unit 106 can implement the shot operation by setting the thus obtained speeds and accelerations in the pan driving unit 102 and the tilt driving unit 103.

<Operation of Apparatus>

As described in "BACKGROUND OF THE INVENTION", depending on the mechanical characteristic of the PT driving unit, a vibration or a sound may be generated by resonance when driving at a speed within a predetermined speed range, and uneven speed may occur when the speed periodically, slightly changes. As described above, it is possible to obtain the speed/acceleration of the shot operation by calculation but the calculated speed falls within the above-described predetermined speed range depending on the designated value (moving speed or moving time).

To cope with this, in the first embodiment, if the calculated speed falls within the above-described predetermined speed range, PT driving is performed by increasing a current value to be applied to each driving unit. If the current value is increased, the torque of the driving unit is increased, and thus the holding force to the image capturing unit 101 is improved (the image capturing unit 101 becomes more difficult to move). Therefore, even if PT driving is performed at a speed within the above-described predetermined speed range, it is possible to reduce occurrence of a vibration and uneven speed.

Note that if the current value is increased, the torque of the driving unit is also increased, and thus a resonance sound may become large. However, the speed range in which uneven speed occurs may often be different from the speed range in which a resonance sound is generated, and thus even if the current value is increased within the speed range in which uneven speed occurs, the resonance sound is hardly influenced.

Figure 4:
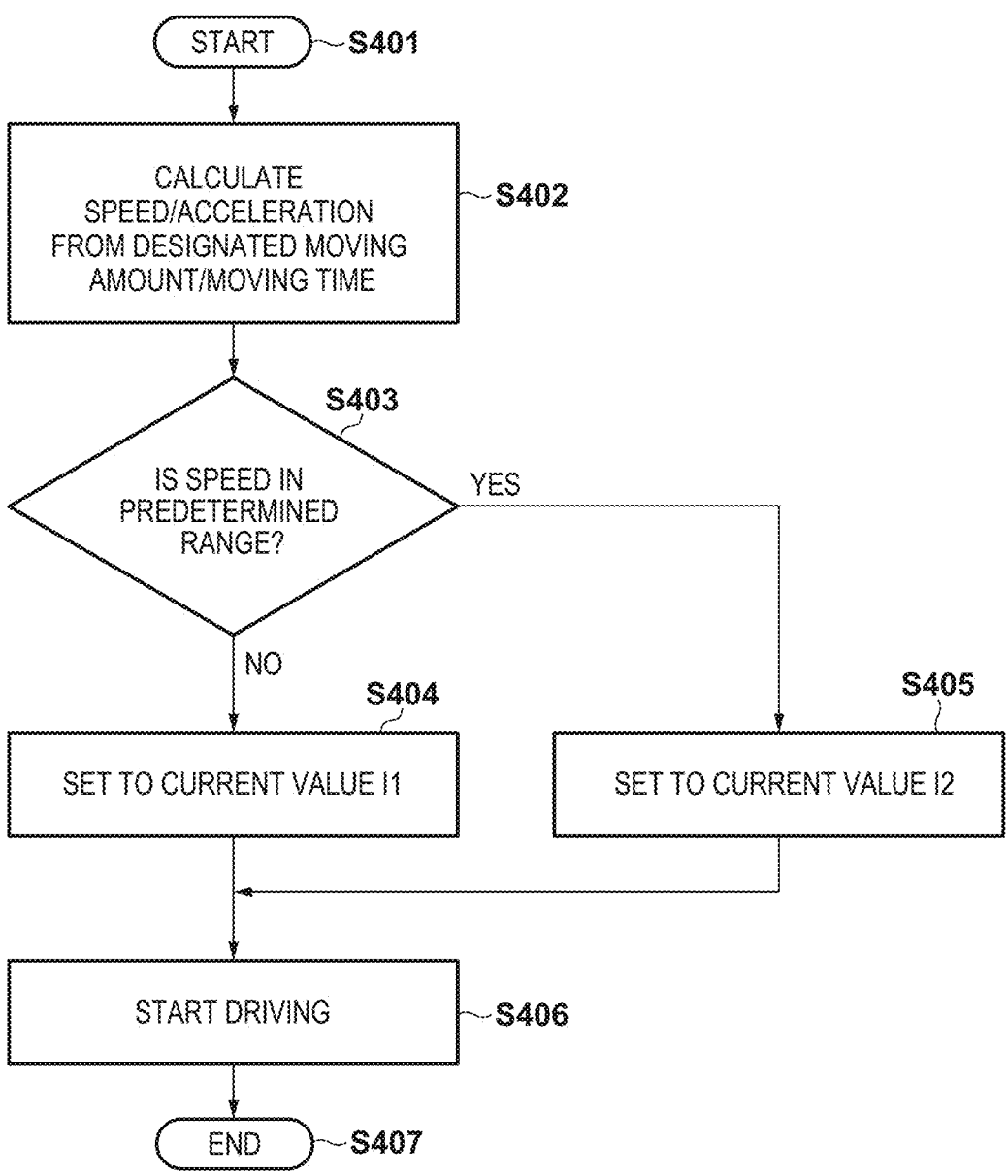
FIG. 4 is a flowchart of PT control (first embodiment)

FIG. 4 is a flowchart of PT control according to the first embodiment. More specifically, FIG. 4 shows PT control executed by the PTZ control unit 106. Upon receiving a shot operation start command via the system control unit 107, the PTZ control unit 106 starts a sequence at the time of the shot operation (step S401).

In step S402, the PTZ control unit 106 accepts designation of the target positions of the pan and tilt positions in the shot operation and the moving time. For example, the designation is accepted, via the communication unit 108 and the system control unit 107, from the client apparatus (not shown) operated by the user. In addition, the current positions of the pan and tilt positions are acquired. Then, the PTZ control unit 106 calculates the moving amount of each driving unit from the current position and the target position, and calculates the speed/acceleration of each driving unit from the designated moving time.

As described above, if the moving speed is designated instead of the moving time, the moving time of each driving unit is calculated based on the designated moving speed, and the longest time is set as the moving time. For example, the moving speed with which a longer one of the moving distances of panning and tilting is obtained is accepted from the user. At this time, it is preferably preset not to accept the moving speed within the resonance speed range. Then, the speed/acceleration of each driving unit is calculated using the set moving time.

In step S403, the PTZ control unit 106 determines whether the speed (the speed of constant-speed driving) calculated in step S402 falls within the predetermined speed range. For example, it is known in advance that uneven speed occurs within the speed range of "2.5°/sec to 3.5°/sec" in the pan driving unit 102, and there is no speed range within which uneven speed occurs in the tilt driving unit 103. In this case, the speed range of "2.5°/sec to 3.5°/sec" is used as the predetermined speed range only in the pan driving unit 102. If the speed of the pan driving unit 102 calculated in step S402 falls outside the predetermined speed range, the process advances to step S404. Alternatively, if the speed of the pan driving unit 102 falls within the predetermined speed range, the process advances to step S405. In other words, if the speed (the speed of constant-speed driving) calculated in step S402 is higher than the upper limit value of the predetermined speed range, or lower than the lower limit value of the predetermined speed range, the process advances to step S404.

Note that in this example, there exists the speed range within which uneven speed occurs only in the pan driving unit 102. However, a predetermined speed range may be set for the tilt driving unit 103, and determination may be performed.

In step S404, the PTZ control unit 106 sets a current to be applied to the driving unit (the pan driving unit 102 or the tilt driving unit 103) to "12" that is the value of current value 1 (I1). In this example, the current value is 0 to 31, and as the numerical value is larger, the current value is larger. Note that current value 1 is a reference current value (a current value at the time of normal driving) set at the time of activation.

In step S405, the PTZ control unit 106 sets a current to be applied to the driving unit (the pan driving unit 102 or the tilt driving unit 103) for which it is determined in step S403 that the speed falls within the predetermined speed range to "16" that is the value of current value 2 (I2). Note that current value 2 has the setting value larger than current value 1 (that is, the current value is larger). This increases the motor driving torque of the driving unit (the pan driving unit 102 and/or the tilt driving unit 103), thereby making it possible to reduce uneven speed.

In step S406, the PTZ control unit 106 starts driving of the pan driving unit 102 and the tilt driving unit 103 (and the zoom driving unit 104) at the speed/acceleration calculated in step S402 with the current value set in step S404 and/or step S405. In this example, each driving unit is driven at the speed shown in FIG. 3A. At this time, the pan driving unit 102 performs driving with the current value "16" and the tilt driving unit 103 performs driving with the current value "12".

In step S407, the PTZ control unit 106 ends the sequence at the time of the shot operation.

As described above, according to the first embodiment, at the time of the shot operation, a current value to be applied to a driving unit whose calculated speed (the speed of constant-speed driving) falls within the predetermined speed range is set larger than the reference current value (the current value at the time of normal driving). By increasing the current value to be applied, the motor driving torque is increased, thereby making it possible to reduce uneven speed. Alternatively, if the calculated speed falls outside the predetermined speed range, the current value to be applied is set to the reference current value (the current value at the time of normal driving), and thus a driving sound or a vibration does not become large. In addition, since it is possible to perform linear driving at the time of the shot operation, the quality of an obtained video is improved.

Note that in the above description, it is determined whether the calculated speed falls within the predetermined speed range, and the setting of the current value is changed. However, for example, the speed and the setting of the current value may be stored in advance in a table or the like, and the setting of the current value may be changed by reading out the value from the table. In the above description, with respect to the driving unit whose calculated speed falls within the predetermined speed range, the current value is made larger over the period of driving control. However, the current value may be made larger only during a period in which the calculated speed falls within the predetermined speed range.

In addition, by increasing the current value, the power consumption of the overall PTZ camera 100 increases. Therefore, if the current value to be applied to the driving unit is increased, such power control that the power consumption of another function unit (another driving system or the like) is decreased may be performed. For example, it may be configured to stop power supply to a function unit that is not used.

Second Embodiment

The second embodiment will describe another form of change control of a current value to be applied to a driving unit. More specifically, an example of changing the current value based on whether a speed falls within (passes through) a predetermined speed range during acceleration/deceleration will be described. Note that the arrangement (FIGS. 1, 2A, and 2B) of a PTZ camera is the same as in the first embodiment and a description thereof will be omitted.

<Operation of Apparatus>

Figure 5:
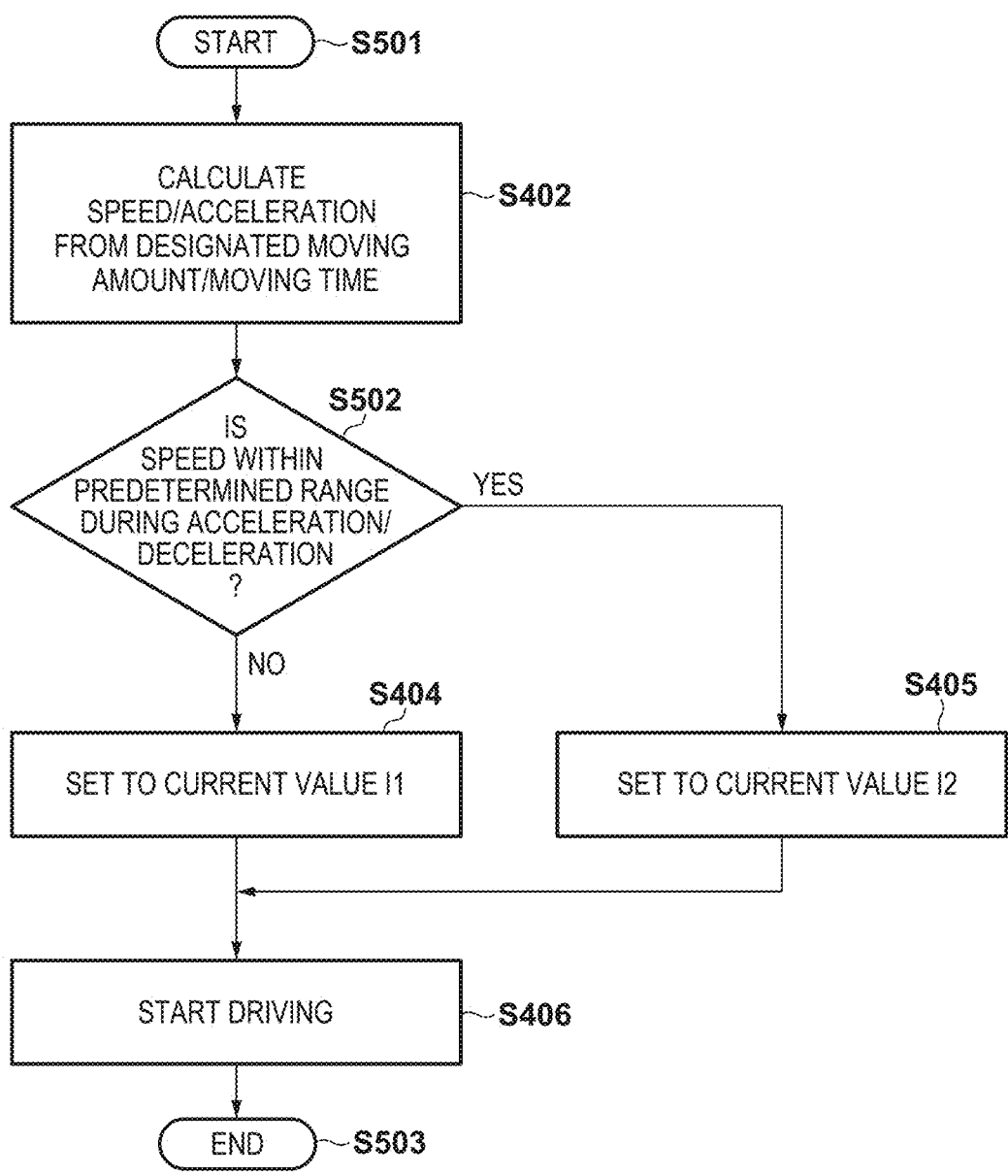
FIG. 5 is a flowchart of PT control (second embodiment)

FIG. 5 is a flowchart of PT control according to the second embodiment. More specifically, FIG. 5 shows PT control executed by a PTZ control unit 106. Note that the operations of steps S402 and S404 to S406 are the same as the operations of the same reference numerals in the first embodiment (FIG. 4) and a description thereof will be omitted. Upon receiving a shot operation start command via a system control unit 107, the PTZ control unit 106 starts a sequence at the time of a shot operation (step S501).

In step S502, the PTZ control unit 106 determines whether a speed calculated in step S402 falls within a predetermined speed range during acceleration or deceleration. In this example, similar to the first embodiment, it is known in advance that uneven speed occurs within the speed range of "2.5°/sec to 3.5°/sec" in a pan driving unit 102, and there is no speed range within which uneven speed occurs in a tilt driving unit 103. Whether the speed falls within the predetermined speed range during acceleration or deceleration can be determined in accordance with, for example, whether the speed of constant-speed driving is equal to or higher than the lower limit value (in this example, 2.5°/sec) of the predetermined speed range. If the speed falls outside the predetermined speed range during acceleration or deceleration, the process advances to step S404. Alternatively, if the speed falls within the predetermined speed range, the process advances to step S405.

In step S503, the PTZ control unit 106 ends the sequence at the time of the shot operation.

As described above, according to the second embodiment, at the time of the shot operation, a current value to be applied to a driving unit whose calculated speed falls within the predetermined speed range during acceleration or deceleration is set larger than a reference current value (a current value at the time of normal driving). Similar to the first embodiment, by increasing the current value to be applied, the motor driving torque is increased, thereby making it possible to reduce uneven speed.

Third Embodiment

The third embodiment will describe another form of change control of a current value to be applied to a driving unit. More specifically, an example of changing the current value based on whether a speed falls within (passes through) a predetermined speed range for a threshold time or more during acceleration/deceleration will be described. Note that the arrangement (FIGS. 1, 2A, and 2B) of a PTZ camera is the same as in the first and second embodiments and a description thereof will be omitted.

<Operation of Apparatus>

FIG. 6 is a flowchart of PT control according to the third embodiment. More specifically, FIG. 6 shows PT control executed by a PTZ control unit 106. Note that the operations of steps S402, S404 to S406, and S502 are the same as the operations of the same reference numerals in the first and second embodiments (FIGS. 4 and 5) and a description thereof will be omitted. Upon receiving a shot operation start command via a system control unit 107, the PTZ control unit 106 starts a sequence at the time of a shot operation (step S601).

In step S602, the PTZ control unit 106 determines whether the time during which the speed calculated in step S402 falls within the predetermined speed range during acceleration or deceleration is equal to or longer than the threshold time. Similar to the second embodiment, assume that the predetermined speed range is the range of "2.5°/sec to 3.5°/sec" in a pan driving unit 102. In this case, when t represents a passage time and v represents the speed of constant-speed driving, the passage time t can be given by:

t=(3.5−2.5)/acceleration (if v is higher than the upper limit value of the predetermined speed range)

t=(v−2.5)/acceleration (if v falls within the predetermined speed range)

t=0 (if v is lower than the lower limit value of the predetermined speed range)

Then, if the time during which the speed calculated in step S402 falls within the predetermined speed range during acceleration or deceleration is shorter than the threshold time, the process advances to step S404. Alternatively, if the time is equal to or longer than the threshold time, the process advances to step S405. For example, the threshold time is set to "1 sec". Assume that as shown in FIG. 3A, with respect to the speed/acceleration calculated in step S402, the pan acceleration is "0.75°/sec^2", the tilt acceleration "1°/sec^2", the speed of constant-speed driving of panning is "3°/sec", and the speed of constant-speed driving of tilting is "4°/sec". In this case, the time during which the speed falls within (passes through) the predetermined speed range is "0.67 sec" in pan driving and is "1 sec" in tilt driving. Therefore, the process advances to step S404 with respect to the pan driving unit 102, and advances to step S405 with respect to a tilt driving unit 103.

In step S603, the PTZ control unit 106 ends the sequence at the time of the shot operation.

As described above, according to the third embodiment, at the time of the shot operation, a current value to be applied to a driving unit whose calculated speed falls within the predetermined speed range for the threshold time or more during acceleration or deceleration is set larger than a reference current value (a current value at the time of normal driving). Similar to the second embodiment, by increasing the current value to be applied, the motor driving torque is increased, thereby making it possible to reduce uneven speed.

In addition, if the speed passes through the predetermined speed range at the large acceleration, the passage time is short and even if uneven speed occurs, this is unnoticeable in a video. Therefore, the current value to be applied to the driving unit can remain the reference current value (the current value at the time of normal driving).

Note that the operation of the third embodiment may be combined with the operation of the first embodiment. That is, the current value may be decided in further consideration of the speed of constant-speed driving. By combining the third embodiment with the first embodiment, it is possible to provide a video in which uneven speed is reduced both in acceleration/deceleration driving and constant-speed driving.

Fourth Embodiment

The fourth embodiment will describe another form of change control of a current value to be applied to a driving unit. More specifically, an example of changing the current value in further consideration of a zoom position (that is, an image capturing angle of view) will be described. Note that the arrangement (FIGS. 1, 2A, and 2B) of a PTZ camera is the same as in the first embodiment and a description thereof will be omitted.

<Operation of Apparatus>

FIG. 7 is a flowchart of PT control according to the fourth embodiment. More specifically, FIG. 7 shows PT control executed by a PTZ control unit 106. Note that the operations of steps S402 to S406 are the same as the operations of the same reference numerals in the first embodiment (FIG. 4) and a description thereof will be omitted. Upon receiving a shot operation start command via a system control unit 107, the PTZ control unit 106 starts a sequence at the time of a shot operation (step S701).

In step S702, the PTZ control unit 106 determines whether a zoom position in a zoom driving unit 104 is on the telephoto side (the image capturing angle of view is small) or the wide side (the image capturing angle of view is large), as compared with a predetermined zoom position (a predetermined angle of view). A blur of a video caused by uneven speed tends to be unnoticeable on the wide side and to be noticeable on the telephoto side. Therefore, if it is determined that the zoom position is on the wide side, the process advances to step S404. Alternatively, if it is determined that the zoom position is on the telephoto side, the process advances to step S405.

In step S703, the PTZ control unit 106 ends the sequence at the time of the shot operation.

As described above, according to the fourth embodiment, at the time of the shot operation, a current value to be applied to a driving unit whose calculated speed (the speed of constant-speed driving) falls within the predetermined speed range is set larger than a reference current value (a current value at the time of normal driving). However, if the zoom position is on the wide side, as compared with the predetermined zoom position, the current value is set to the reference current value (the current value at the time of normal driving). Since the current value to be applied is set to the reference current value, it is possible to suppress a driving sound or a vibration from becoming large.

Note that in the above description, binary determination (telephoto side or wide side) is performed based on one predetermined zoom position for determination of the zoom position, and two kinds of current values are set. However, more detailed multi-value determination may be performed to set three or more kinds of current values.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-142379, filed Sep. 1, 2023 which is hereby incorporated by reference herein in its entirety.

12

What is claimed is:

1. A control apparatus for controlling an image capturing unit capable of changing an orientation, comprising:
   a driving unit configured to change the orientation of the image capturing unit;
   one or more memories storing instructions; and
   one or more processors executing the instructions to:
   perform driving control of the driving unit in a case where the orientation of the image capturing unit is changed, wherein
   in a case where the orientation of the image capturing unit is changed and in a case where a speed of the driving unit does not fall within a predetermined speed range, a first current value applied at the time of normal driving is applied to the driving unit, and in a case where the orientation of the image capturing unit is changed and in a case where the speed of the driving unit falls within the predetermined speed range, a second current value larger than the first current value is applied to the driving unit,
   the driving unit includes a pan driving unit configured to move the orientation of the image capturing unit in a pan direction, a tilt driving unit configured to move the orientation of the image capturing unit in a tilt direction, and a zoom driving unit configured to change an image capturing angle of view of the image capturing unit,
   in a case where the orientation of the image capturing unit is changed to a designated direction, the pan driving unit and the tilt driving unit start driving substantially simultaneously, and stop driving substantially simultaneously,
   in a case where the orientation of the image capturing unit is changed, driving control in each of the pan driving unit and the tilt driving unit includes acceleration driving control, constant-speed driving control, and deceleration driving control,
   in a case where a speed of the constant-speed driving control in at least one driving unit out of the pan driving unit and the tilt driving unit falls within the predetermined speed range, the second current value is applied to the at least one driving unit, and
   in a case where the image capturing angle of view of the image capturing unit is larger than a predetermined angle of view, the first current value is applied to the at least one driving unit.

2. The apparatus according to claim 1, wherein
   in a case where a speed during a period of at least one of the acceleration driving control and the deceleration driving control in at least one driving unit out of the pan driving unit and the tilt driving unit falls within the predetermined speed range, the second current value is applied to the at least one driving unit.

3. The apparatus according to claim 2, wherein
   in a case where a time during which the speed of the at least one driving unit falls within the predetermined speed range is shorter than a threshold time, the first current value is applied to the at least one driving unit.

4. The apparatus according to claim 1, wherein
   the predetermined speed range is a speed range within which uneven speed occurs in a case where the first current value is applied to the driving unit to perform driving.

5. The apparatus according to claim 1, wherein
   in a case where the second current value is applied to the driving unit, such power control that power consumption of a predetermined function unit included in the image capturing unit or the control apparatus is small is performed.

6. A control method for a control apparatus that controls an image capturing unit capable of changing an orientation, comprising:

performing driving by applying, to a driving unit, a first current value applied at the time of normal driving in a case where the orientation of the image capturing unit is changed and in a case where a speed of the driving unit does not fall within a predetermined speed range, and performing driving by applying, to the driving unit, a second current value larger than the first current value in a case where the orientation of the image capturing unit is changed and in a case where the speed of the driving unit falls within the predetermined speed range, wherein the driving unit includes a pan driving unit configured to move the orientation of the image capturing unit in a pan direction, a tilt driving unit configured to move the orientation of the image capturing unit in a tilt direction, and a zoom driving unit configured to change an image capturing angle of view of the image capturing unit, in a case where the orientation of the image capturing unit is changed to a designated direction, driving by the pan driving unit and driving by the tilt driving unit are substantially simultaneously started, and driving substantially simultaneously are stopped, in a case where the orientation of the image capturing unit is changed, driving control in each of the pan driving unit and the tilt driving unit includes acceleration driving control, constant-speed driving control, and deceleration driving control, in a case where a speed of the constant-speed driving control in at least one driving unit out of the pan driving unit and the tilt driving unit falls within the predetermined speed range, the second current value is applied to the at least one driving unit, and in a case where the image capturing angle of view of the image capturing unit is larger than a predetermined angle of view, the first current value is applied to the at least one driving unit.

7. A non-transitory computer-readable recording medium storing a program that, when executed by a computer, causes the computer to perform a control method for a control apparatus that controls an image capturing unit capable of changing an orientation, comprising:

performing driving by applying, to a driving unit, a first current value applied at the time of normal driving in a case where the orientation of the image capturing unit is changed and in a case where a speed of the driving unit does not fall within a predetermined speed range, and performing driving by applying, to the driving unit, a second current value larger than the first current value in a case where the orientation of the image capturing unit is changed and in a case where the speed of the driving unit falls within the predetermined speed range, wherein the driving unit includes a pan driving unit configured to move the orientation of the image capturing unit in a pan direction, a tilt driving unit configured to move the orientation of the image capturing unit in a tilt direction, and a zoom driving unit configured to change an image capturing angle of view of the image capturing unit, in a case where the orientation of the image capturing unit is changed to a designated direction, driving by the pan driving unit and driving by the tilt driving unit are substantially simultaneously started, and driving substantially simultaneously are stopped, in a case where the orientation of the image capturing unit is changed, driving control in each of the pan driving unit and the tilt driving unit includes acceleration driving control, constant-speed driving control, and deceleration driving control, in a case where a speed of the constant-speed driving control in at least one driving unit out of the pan driving unit and the tilt driving unit falls within the predetermined speed range, the second current value is applied to the at least one driving unit, and in a case where the image capturing angle of view of the image capturing unit is larger than a predetermined angle of view, the first current value is applied to the at least one driving unit.

\* \* \* \* \*